US006529784B1

(12) United States Patent
Cantos et al.

(10) Patent No.: US 6,529,784 B1
(45) Date of Patent: Mar. 4, 2003

(54) METHOD AND APPARATUS FOR MONITORING COMPUTER SYSTEMS AND ALERTING USERS OF ACTUAL OR POTENTIAL SYSTEM ERRORS

(75) Inventors: Allan Cantos, Westford, MA (US); Neil Mager, Westford, MA (US); Keith Erskine, N. Chelmsford, MA (US); Mike Vilot, Merrimac, NH (US); Alison Whittier, Chelmsford, MA (US)

(73) Assignee: Caldera Systems, Inc., Orem, UT (US)

( * ) Notice: Subject to any disclaimer, the term of this patent is extended or adjusted under 35 U.S.C. 154(b) by 0 days.

(21) Appl. No.: 09/514,488

(22) Filed: Feb. 29, 2000

(51) Int. Cl.[7] .............................. G05B 9/02; G06F 9/44
(52) U.S. Cl. ..................... 700/79; 709/203; 709/246; 717/172
(58) Field of Search ................... 700/79; 707/3; 709/200–203, 216, 226, 246; 717/171, 172, 176, 177; 345/735, 736; 340/3.1, 3.43, 3.44, 3.51; 705/8; 714/38, 46, 47

(56) References Cited

U.S. PATENT DOCUMENTS

| 5,581,764 | A |   | 12/1996 | Fitzgerald et al. | .......... 709/223 |
| 5,696,809 | A | * | 12/1997 | Voit | .................. 379/5 |
| 5,696,965 | A | * | 12/1997 | Dedrick | .......... 395/610 |
| 5,933,646 | A |   | 8/1999  | Hendrickson et al. | ...... 395/712 |
| 6,021,437 | A | * | 2/2000  | Chen et al. | .......... 709/224 |
| 6,151,600 | A | * | 11/2000 | Dedrick | ............ 707/10 |
| 6,181,692 | B1 | * | 2/2001 | DeGolia, Jr. | ........ 370/352 |
| 6,289,378 | B1 | * | 9/2001 | Meyer et al. | ........ 709/223 |
| 6,314,420 | B1 | * | 11/2001 | Lang et al. | ............ 707/3 |

OTHER PUBLICATIONS

"Project: AppControl," earliest version history date Jan. 21, 1999.
Fax of Proprietary Information Agreement, with Exhibit A "List of Prior Inventions and Original Works of Authorship," signed Nov. 6, 1998, earliest Exhibit A entry dated 1990–1992.
"Internet–Based Software Management Tools & Services for LINUX," date unknown.
"Company Confidential: Questions Answered," pp. 1–10 plus "AppControl Process Flow" diagram, date unknown.

* cited by examiner

Primary Examiner—Paul P. Gordon
(74) Attorney, Agent, or Firm—Computer Law++

(57) ABSTRACT

A method for providing system management services to a customer's network of target computers through a communications network is described. Service subscribers have at least one target computer system. Each target computer system has a hardware configuration and a software configuration. An agent process is hosted on at least one target computer system of each subscriber. Each agent communicates with a centralized control server through a communication link. The control server manages the hardware or software configurations of the target computer systems through the server. By centralizing the resources for managing the computing resources of several subscribers at a single control server, the need for redundant management resources at each subscriber is reduced or eliminated. A method for providing a customer system management information in response to receiving information about the customer's target computer system is also described.

63 Claims, 4 Drawing Sheets

METHOD AND APPARATUS FOR MONITORING COMPUTER SYSTEMS AND ALERTING USERS OF ACTUAL OR POTENTIAL SYSTEM ERRORS

BACKGROUND

Large networks of computers, particularly those which share common hardware components and software applications, are typically administered centrally. As these networks grow in size and complexity, it becomes increasingly difficult for system users (including system administrators) to determine whether and how additions of new software or hardware will affect the existing hardware and software used by the system. Additionally, it becomes more difficult to determine when upgraded versions of existing software arc available and compatible with the existing system. Lastly, the increasing complexity of networked systems makes it more difficult to investigate defects, software dependencies or conflicts, or information critical to the operation of existing software and hardware. In such complex systems, software dependencies are particularly problematic, as many different software applications may scan the same system files for data or software code to enable basic or enhanced functionality or write (and overwrite) data to the same system files. As a result, system users typically treat system files as unalterable "black boxes," limiting system flexibility.

Existing system monitoring and management tools, such as the Hewlett-Packard Company's Openview system or the Computer Associates International, Inc.'s Unicenter systems, employ agents running on target computer systems. These systems rely on an agent or a software process which monitors target computer systems for configuration, diagnostic, frequency of use, and other information which run on the target computer systems to collect configuration and diagnostic information about the target computer systems and relay it to a centralized station. From this station, a system administrator can review the information and take appropriate actions.

As described in U.S. Pat. No. 5,933,646 to Hendrickson et al., target computer systems commonly have numerous installed software packages which can be enabled, disabled, installed or removed. A configuration database stores information associated with each of these software packages, including information indicating whether the software package is enabled, the location of the software package within a hierarchical filing structure and a dependency listing (showing the interdependencies between the software package and other software packages on the target computer systems or system files) for each software package. A software manager server supports a software manager graphical user interface (GUI) which permits a system administrator to view the contents of the configuration database. The software manager also carries out administrator-specified changes to the system and amends the configuration database to reflect the changes.

"Inside TCP/IP," by Matthew Flint Arnett et al. (New Riders Publishing, Indianapolis, Ind. 1994) further describes management of networked computer systems. Specifically, it describes the use of simple network management protocol (SNMP) agents to monitor target computer systems. The SNMP agents send error trap messages to a SNMP manager when measured system parameters exceed a threshold value. The SNMP manager may present the error trap signals to a system administrator. The system administrator may set the threshold values at which SNMP traps are triggered.

The network of target computer systems may be a local area network (LAN) arranged in a star, bus or ring topology. Network communication priority may be handled according to either the Ethernet or token ring protocols. In an Ethernet LAN, a transmitting station monitors the network transmission channel to determine if it is busy and transmits only after the transmission channel is not busy. In a token ring LAN, communication priority is passed from one station to the next and a station must have priority before it can transmit a message. Network communications can follow the TCP/IP protocol in which messages are divided into discrete "packets" of information which are addressed to particular receiving addresses.

The configurations of target computers in a customer network are typically monitored by a single dedicated system administrator. As changes to the existing software packages are made, old software packages are removed from the target computers or new software packages are added to the target computers, the system administrator must typically change its configuration database in response. Such a process of updating a configuration database incurs significant cost to operating and maintaining the network.

SUMMARY

Generally, an embodiment of the present invention is directed to a method and system for managing a network of target computers. Another embodiment of the invention is directed to agents for collecting configuration, diagnostic, frequency of use or other information from the target computer system and transmitting the collected information to a central control server. The control server receives the information and accesses relevant information from a database of software information. The control server then formats and transmits this information to the agent. The agent may act on the information directly or may display the information to a user through a management tool GUI.

Another embodiment of the present invention is directed to a method of providing system management services to a network of target computers including the steps of enrolling customers to receive computer system management services for a fee, receiving information about the customer network from agents associated with target computer systems, comparing the target computer system information with software and hardware information stored in a database and transmitting that information to the customer.

DETAILED DESCRIPTION

Embodiments of the present invention relate to providing a management service to a plurality of subscribers having at least one target computer system. Each target computer system has a hardware configuration and a software configuration. An agent process is hosted on at least one target computer system of each subscriber. Each agent communicates with a centralized control server through a communication link. The control server manages the hardware or software configurations of the target computer systems through the server. By centralizing the resources for managing the computing resources of several subscribers at a single control server, the need for redundant management resources at each subscriber is reduced or eliminated.

As shown in the drawings for purposes of illustration, embodiments of the present invention are directed to a method and system for managing a network of target computers. The term target computers is not limited solely to computers per se and may include, without limitation, other processor-based devices or network-communicating hardware components, such as printers, servers, terminals, copiers, fax machines, mobile/wireless telephones and Internet telephones.

Figure 1:
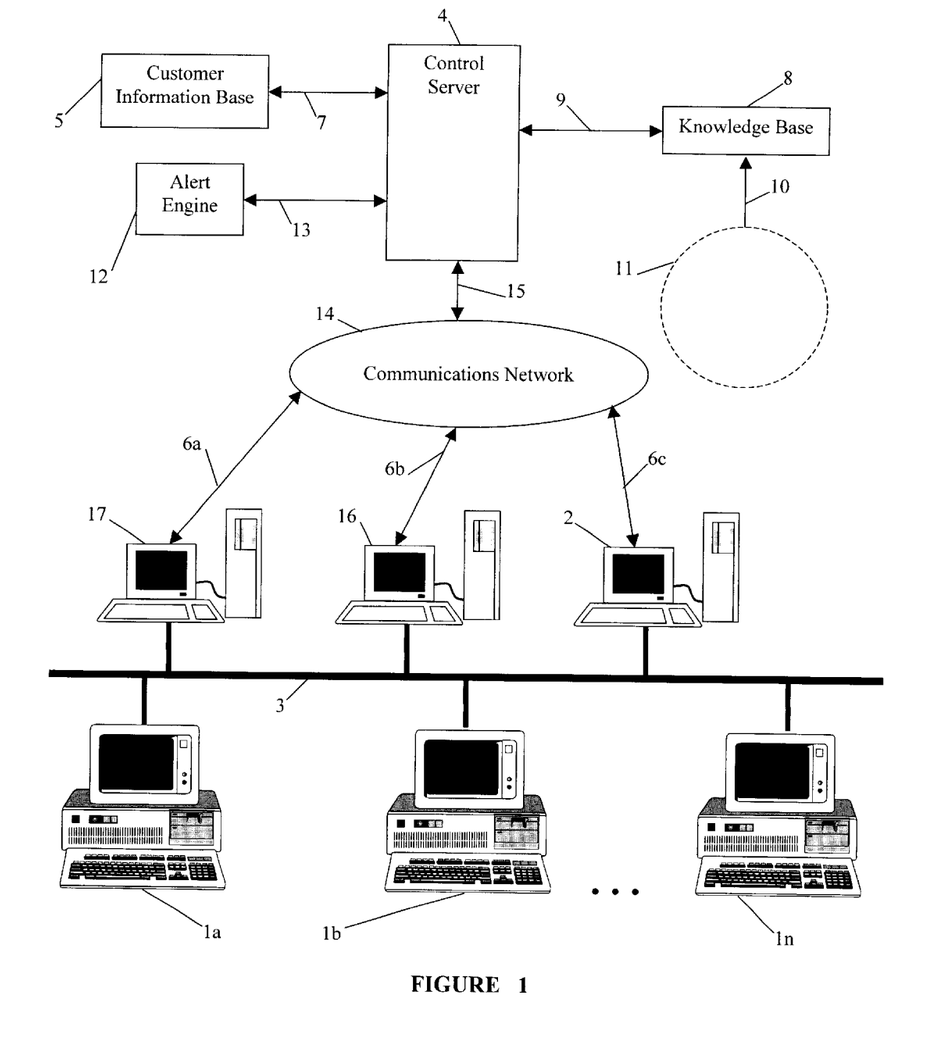
FIG. 1 is a signal flow diagram illustrating the major components of the system for monitoring target computer systems and communicating software information to target computer system users.

FIG. 1 illustrates the network topology according to an embodiment of the present invention. A customer site consists of a plurality of target computer systems 1a to 1n. The target computers are connected with a network management server 17. Each target computer system may be associated with 9 dedicated agent processor 2 that runs a process known as an "agent". The customer network may also include a separate Web server 16. In alternate embodiments, the Web server 16, the agent and the network management server 17 need not be hosted on dedicated platforms. For example, instances of the agent may reside on each of the target computer systems. Customer network communications link 3 allows information to be transmitted among the target computers 1a to 1n, network management server 17, dedicated agent processor 2 and other components (not shown) of the customer network, e.g., shared hardware components such as a printer server and printer. The customer network may be a local area network (LAN), metropolitan area network (MAN), wide area network (WAN) or any other type of computer network and may use any network implementation, including, for example, the Ethernet, ARCnet, Token Ring implementations. Information communicated over the customer network communications link may conform to any data communications protocol, including TCP/IP, IPX/SPX, NetBios and AppleTalk. Customer network communications link 3 may consist of a wire line (such as twisted-pair telephone wire, coaxial cable, electric power line, optical fiber wire, leased line or the like) or wireless (such as satellite, cellular, radio frequency or the like) connection.

FIG. 1 depicts an embodiment of the invention in which a single agent resides on a dedicated agent processor 2 separate from the other nodes of the network. In other embodiments of the invention, an agent process may reside on a target computer 1a to 1n, the Web server 16 or the network server 17 and the customer network may include several agents. An agent may reside on an associated target computer or on a separate computer electronically or remotely associated with the target computer. The agent in the illustrated embodiment can either be associated with a single target computer or a plurality of target computers. Therefore, the agent may be a distributed process in a system with multiple target computers. In an embodiment of the invention, the agent communicates with a control server 4 according to a TCP/IP protocol (or other available protocol) using techniques known to those of ordinary skill in the art. Furthermore, although FIG. 1 depicts target computers 1a to 1n as computer terminals, any component included in the customer network, including the network server 17, Web server 16 or hardware components such as a printer server and printer (not shown), may be a "target computer."

An agent associated with a target computer interrogates the target computer for system information. The agent may be implemented using a polling-only approach, in which the agent periodically interrogates the target computer system for information, an interrupt-based approach, in which the agent interrogates the target computer when an extraordinary event occurs, or a hybrid or any other approach.

In an interrupt-based embodiment of the invention, the agent may maintain thresholds for measuring various system parameters during the interrogation process. The agent may transmit an error message when a measured system parameter exceeds a threshold or some other extraordinary event occurs. Particularly in heterogeneous networks of target computer systems having different operating systems or software platforms, the agent may be written in Java or another platform-independent language to maximize portability between target computer systems. A Java embodiment of the agent may employ remote method invocation (RMI). Other embodiments may employ another remote procedure call method of communication to execute target computer system invocation.

Embodiments of the agent may adapt to specific characteristics of a target computer system with which it is associated. For example, the agent may adjust its threshold values to conform to system load requirements. The agent may also be changed by input from a target computer user (including a network system administrator) through the management tool GUI or through the addition of "plug-ins" from the control server 4. A plug-in may be a software instruction(s) which can be added to the agent process to alter the way in which the agent interrogates the target computer system. For example, a plug-in or user input may instruct the agent to look for a new file associated with a newly-introduced software package, reset threshold values or define a combination of conditions as a new error. The types of plug-ins added to an agent may depend on the purpose of the target computer 1a to 1n being monitored by the agent and the software running on that target computer 1a to 1n. The control server 4 may update the agent plug-ins as the target computer environment, host environment or control server environment changes.

The agent transmits target computer system information in a communications network 14 over network connection 6c. The information is received at the control server 4 over network connection 15. The communications network 14 can be any type of public communications network (e.g., the Internet or a dedicated channel in a public switched telephone network), private communications network (e.g., a LAN, WAN or MAN) or a hybrid of public and private communications networks. Where a public network is used, communications between the control server 4, the communications network 14 and customer network components connected to the communications network 14 (e.g., the network server 17 and the Web server 16) may be passed through a firewall and/or encrypted to ensure that these communications are secure and uncorrupted. Communications between customer network components, the communications network 14 and the control server 4 may conform to any data communication protocol consistent with the type of communications network 14 chosen. For example, where the Internet serves as the communications network 14, information may be transmitted according to the TCP/IP protocol. Like customer network communications link 3, network connections 6a, 6b, 6c and 16 may consist of wire line or wireless connections. In a heterogeneous network of target computers and customer networks using different operating systems or software platforms, communication between agents and the control server 4 through the communications network 14 can be in the form of procedure calls or, in a Java-based embodiment of the agent, remote method invocation. Other embodiments may employ different communication protocols such as CORBA or JINI.

To reduce the length and number of messages communicated between the agent and the control server 4, the control server 4 may store target computer system information received from the agent in a customer information base (CIB) 5. The agent associated with a target computer may then update the information stored in the CIB 5 for that target computer either periodically (for example, in a polling-only agent embodiment) or as changes to the target computer system are detected (for example, in an interrupt-based agent embodiment). In this embodiment, the amount of information communicated by an agent to the control server in each transmission may be lessened if each message consists only of changed information and/or user queries. Furthermore, in such an embodiment, alert information can be selectively sent by the control server 4 to only those agents associated with affected target computer systems. The CIB 5 typically stores system information for all target computer systems with agents that communicate with the control server 4 over the communications network 14. Control server 4 sends information to and retrieves information from CIB 5 over communication link 7. Communication link 7 may consist of electrical connections internal to a computer, telephone lines, coaxial cables or wireless systems. The CIB 5 may also contain billing or subscription information for a particular customer. The control server 4 may access this subscription or billing information periodically or with each communication to the agent to determine the type of operating system the customer is using, to assess whether the customer is up-to-date on payments or to transmit billing information to the agent.

The control server 4 also communicates with the knowledge base (KB) 8 over communication link 9. Software information 11 is collected from various sources and used to update KB 8. In an embodiment of the invention, software information 11 is automatically collected from sources known to have useful information. In other embodiments, the software information may be collected manually. The automatically collected information is then evaluated, analyzed for importance and formatted before being used to update KB 8. Sources of software information 11 include, among other things, software vendors, public bulletin boards and customer feedback. Customer feedback information may be automatically collected by agents 2a to 2m and transmitted to the control server. In one embodiment, the KB 8 consists of several databases, each containing software, hardware and systems information specifically relevant to a particular operating system (e.g., Windows, Unix, Linux or Apache) or software component (e.g., software components produced by Oracle or Microsoft). If a customer network used the Linux operating system, for example, the customer may subscribe to only the Linux database in the KB 8 and the control server may search only that database for software or hardware information.

The control server 4 may include an alert engine 12. The alert engine 12 may monitor the KB 8 and/or update information transmitted to the KB 8 to determine when an alert should be issued to agents communicating with the control server 4. In the embodiment shown in FIG. 1, the alert engine 12 transmits the alert message through the control server 4 and its network connection 15. The alert engine 12 may transmit a general alert message to all agents. In this embodiment, each agent may be responsible for determining if the alert message is relevant to the associated target computer system 1a to 1n. Alternatively, the alert engine 12 may transmit the alert message to only those agents associated with affected target computer systems. In this embodiment, the alert engine 12 may determine which agents are associated with affected target computer systems by reviewing information in the customer information base 5.

The control server 4 may also access information in the KB 8 to determine when new software packages are available to customers. Upon finding that a new software package is available, the control server 4 may send a general message to all agents communicating with the control server 4 that the software package is available. Alternatively, the control server 4 may send a message that the software package is available to only those agents whose target computer systems are compatible with the new software package. Furthermore, the control server 4 may send a plug-in to all agents or selected agents to look for files associated with the new software package during the process of interrogating their associated target computer systems.

The agent may be implemented as a continuously running background process such as a daemon on a UNIX-based system or a service on a Windows NT-based system residing on a target computer. The process launches when the target computer system reboots. An agent may be multi-threaded to perform several operations at once, e.g., monitor software and processes, listen for software configuration and alert messages from the control server 4 and transmit information to the management tool, control server 4, or KB 8. Both the agent and software components of the control server 4 may be written in Java script for portability and flexibility in communication with agents functioning on various platforms.

A user query may be submitted to the control server 4 either through the management tool GUI (not shown) and the agent or, alternatively, directly from the user through a Web browser (not shown) and the Web server 16. For example, a user may request information on how installing a new software package or removing an existing software package on the existing target computer system would affect other software applications and hardware components existing in the target computer system or customer network. A user query may also be sent to determine whether upgraded versions of software packages are available and compatible with the target computer system.

Figure 2A:
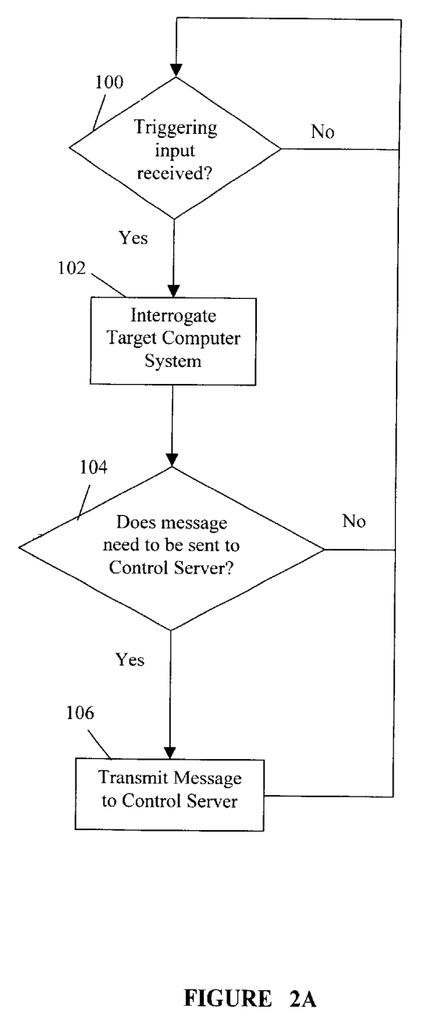
FIG. 2A is a flow chart diagram illustrating transmission of target computer system information from an agent to the control server.

FIG. 2A shows a flow diagram of the information transmission process in an embodiment of the agent. In decision block 100, triggering inputs may be received by the agent from the target computer system itself, from the management tool GUI (i.e., from the user) or from the control server 4. Examples of triggering inputs from the target computer system include a set number of clock pulses in a system where the agent periodically transmits target computer system information to the control server 4 in a polling-only agent embodiment. Alternatively, in an interrupt-based agent embodiment where the control server 4 maintains target computer system information and is informed by the agent upon a change being made to the target computer system, a triggering input may include a change in the configuration of the target computer system. An example of a triggering input from the management tool GUI may be a query as to the effect of upgrading a particular software package on the target computer system. A triggering input from the control server may be a ping request for target computer system information.

In response to such triggering inputs, the agent interrogates the target computer system for information (step 102). The information collected from the interrogation process may include, among other things, information related to software or hardware configuration information, software or hardware specification information, software or hardware diagnostic information, software or hardware history information and software or hardware frequency of use information. Specific examples of system information may include the type of operating system being used by the target computer system, the number and types of software applications and hardware components available to the target computer system and the location of electronic files associated with such software applications or hardware components, specifications (e.g., file or buffer size, memory requirements, hardware operational characteristics) for such software applications or hardware components, system diagnostic information, and software or hardware frequency-of-use statistics. Commonly, a software application, device driver or operating system will already have functions designed to collect such information. For example, in Unix-based systems, the "finger" command allows a user to retrieve information about users logged in to the system, the "ping" command allows a user to determine the status of another system, and the "ps" command provides the user with information about the status of processes running on the system. An agent enters commands and search diagnostic and configurations files to select from the resulting information pertinent target computer system information. The agent executes an interrogation script of function calls and file searches.

In an embodiment in which the control server maintains target computer system information updated by agent transmissions only when target computer system information changes, step 104 may initiate transmission of a message to the control server at step 106 if the agent compares past stored target computer system information with target computer system information collected from the most recent interrogation and finds that the two information sets do not match. In this case, the agent would update the control server's stored target computer system information. Alternatively, in an embodiment in which the control server 4 does not store target computer system information and the agent periodically updates the control server 4, step 104 initiates transmission of a message to the control server at step 106 if the required number of clock pulses had been received since the last transmission from the agent to the control server. In yet another embodiment, the agent may transmit a message to the control server 4 at step 106 if in step 104 the agent determines that an anomaly exists in the target computer system. The agent may discover an anomaly where, for example, the agent tracks target computer system resources (e.g., disk space, disk I/O, or memory utilization) by collecting real-time data measuring these resources and screens the data for symptomatic conditions, i.e., conditions that indicate that an anomaly may exist. For example, the agent may monitor memory availability and CPU utilization to detect that additional memory should be provided. The symptomatic conditions may be defined and/or updated by the control server. The agent may then transmit a message containing target computer system information relevant to the anomaly for diagnosis by the control server 4.

Step 106 entails the agent transmitting a message containing target computer system information to the control server 4 through the communications network. The agent may translate the information into a form usable by the control server 4 or a form suitable for transmission. For example, the agent may transmit the information according to the TCP/IP communication protocols.

Figure 2B:
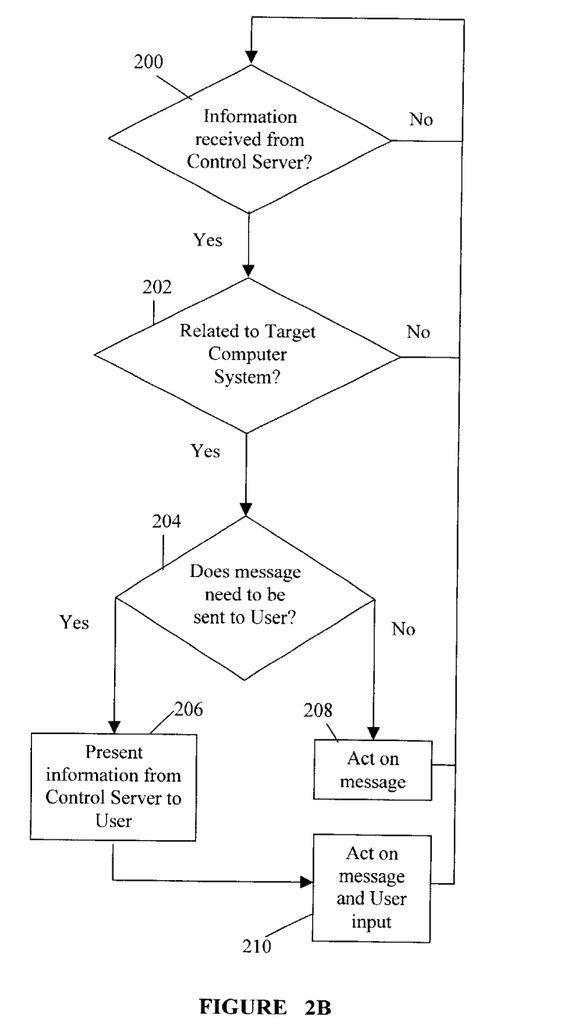
FIG. 2B is a flow chart diagram illustrating reception of information by an agent from the control server and action upon the received information.

FIG. 2B shows a flow diagram of the agent's process for receiving information from the control server. According to an embodiment of the present invention, information received by the agent from the control server 4 may include alert information and responses to user queries. Alert information may be broadcast to all agents or selectively transmitted to agents for whom the alert information is relevant. In an example of the latter embodiment, an alert message indicating that a particular software package was susceptible to a buffer overrun attack may only be transmitted to only selected agents associated with target computer systems that have or use that software package, or for which that software package would be an upgrade. Two examples of user queries include requests for information on the effect on the target computer system of upgrading, installing or removing a software package, and the availability of upgraded versions of software packages currently used by the target computer system.

When the agent receives information from the control server 4, as determined at step 200, the agent determines if the information is related to the target computer system at step 202. Step 202 may be employed in embodiments of the invention in which the control server 4 transmits general messages to the agents without regard to the target computer systems to which they are associated. An example of this embodiment is a system in which the control server sends a general alert message to all agents on the network about a particular software package and each agent determines whether that alert message is applicable to its associated target computer system(s). To make this decision, an agent may examine the incoming message to determine the subject software package(s), and review stored or collected target computer system information to determine if any of the same software packages are or have been used by the system. If the message from the control server is not related to the target computer system, the message is ignored and the agent waits for the next message from the control server 4 to be received.

If the message is related to the target computer system, the agent determines whether the information is to be sent to the user in step 204. Some messages received from the control server 4 may not require the user's attention or action. For example, the control server may send the agent an updated plug-in that changes how the agent interrogates the target computer system in a way completely transparent to the user. In this case, step 204 initiates the action required by the message as shown at step 206. Other messages, e.g., alert messages, responses to user queries and unsolicited upgrade availability information, may be brought to the attention of the user. In this case, step 204 initiates the presentation of relevant information to the user, either through the management tool GUI, electronic mail, a printed report or some other form, at step 208. In some cases, user input may be required for further action. For example, in response to a user query asking about the effects of installing a particular software application on the target computer system, the control server 4 may respond with a message saying that a particular software patch must be installed to resolve conflicts between the software package to be installed and software packages already available on the target computer system. Upon receiving this type of message, the agent's communication to the user may include an option for the user to reply with an instruction to download and install the software patch when the primary software package is installed. In that case, after communicating the relevant information to the user, the agent would proceed to block 210 and would perform these download and installation functions if instructed to do so by the user. In another example, where a user query as to the availability of an upgrade for an existing software package results in the control server transmitting a response message to the control server that such an upgrade is available, the agent's communication to the user may include options to install the upgrade, remove the existing software package, or both.

Figure 3:
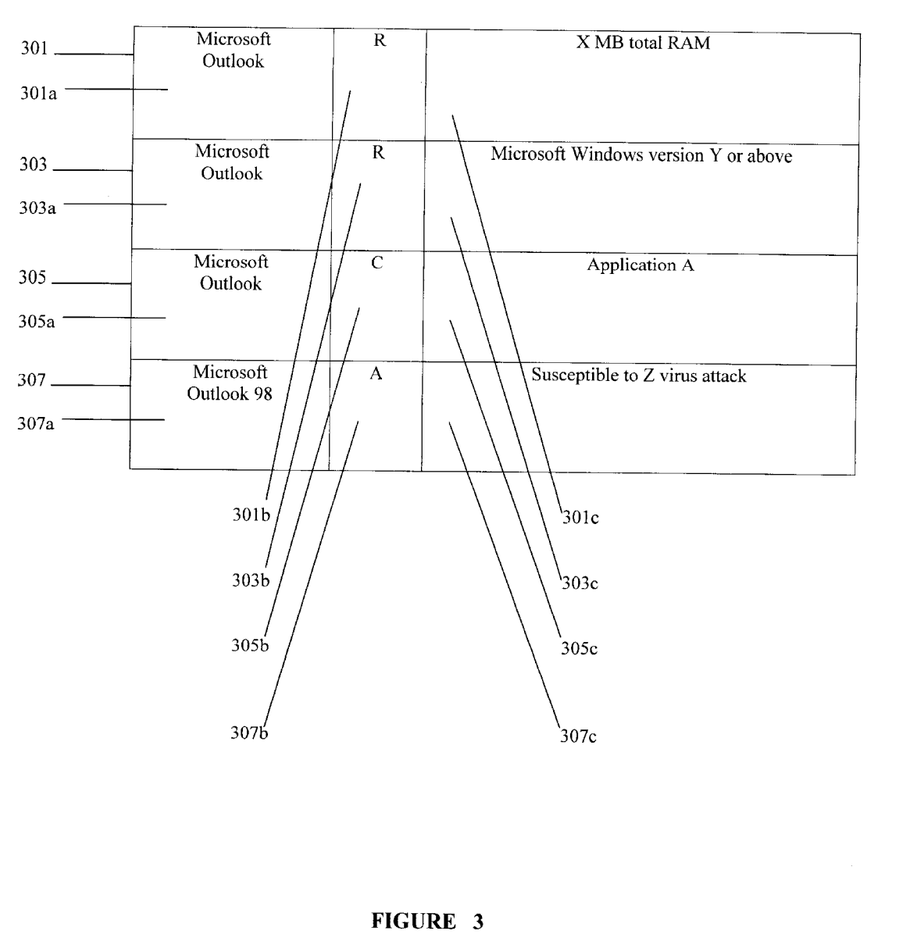
FIG. 3 illustrates a set of sample records in the knowledge base (KB).

FIG. 3 shows a set of sample records in the Knowledge Base (KB). KB database records may include the name of the software package or hardware component to which the information pertains, the type of information contained in the record, and the information itself. For example, for record 301, the software/hardware element 301a is "Microsoft Outlook," meaning that the entry relates to Microsoft Outlook, a commonly used software package including electronic mail, address book and calendaring functions. The database may index records by associated software/hardware elements. The control server 4 may then access records in the database through indexes to hardware/software elements. The record type element 301b designates the record as of the "R" type, meaning that the information contained relates to software or hardware requirements of the software package or hardware component to which the record pertains, here Microsoft Outlook. The information element 301c completes the information stored in the record. Therefore, as read by the control server, record 301 would mean that Microsoft Outlook requires at least X MB of total RAM to execute properly. The control server would then compare this requirement information with target computer system information to determine if the target computer system satisfies the requirement.

Record 303 shows how a software dependency relationship can be represented in a requirement-type record. The information element 303c indicates that Microsoft Outlook will not execute properly unless the target computer system also has "Microsoft Windows version Y or above." If the control server 4 discovers that the target computer system does not have Microsoft Windows or that its version of Microsoft Windows is older that version Y, the control server 4 may execute additional searches to determine if upgraded versions of Microsoft Windows are available and compatible with the target computer system.

Record 305 shows a conflict-type record, as indicated by the record type element "C". This record indicates that Microsoft Outlook conflicts with Application A. The control server 4 would then determine if Application A existed in the target computer system. Conflict-type records may contain more detailed information on the nature of the conflict and instructions for avoiding conflict problems or software patches. For example, the information element for a conflict-type record may specify that the piece of software in the software/hardware element writes over particular files created by a specified software application.

Record 307 shows an alert-type record, as indicated by the record type element "A". This record indicates that Microsoft Outlook 98 is susceptible to a Z virus attack. The control server (through the alert engine) may generally broadcast an appropriate alert message or selectively broadcast an alert message only to agents associated with target computer systems on which Microsoft Outlook 98 is installed.

Figure 4:
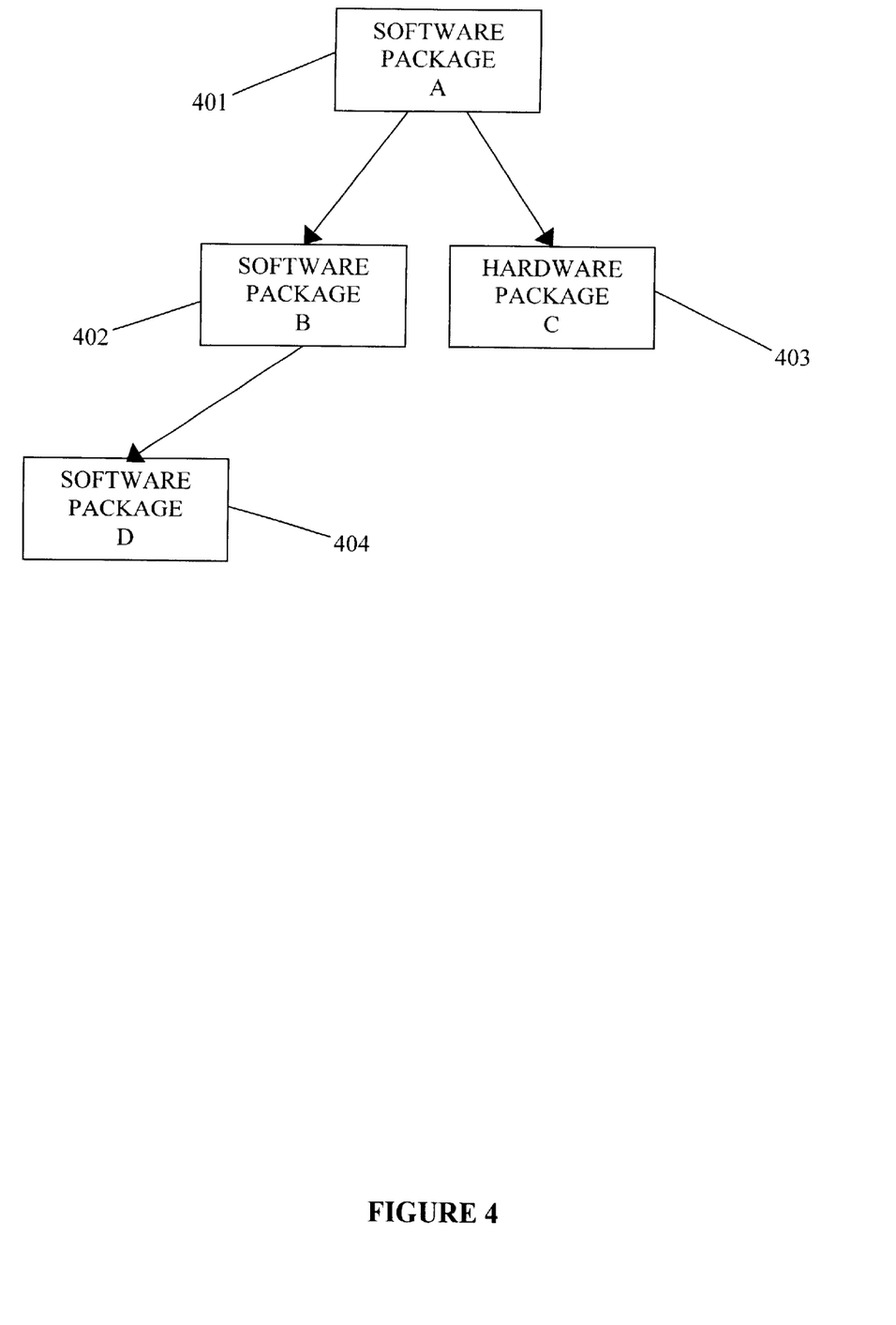
FIG. 4 shows a dependency tree diagram illustrating direct and indirect dependencies.

A software package or hardware component may be either directly dependent or indirectly dependent upon another software package or hardware component. FIG. 4 illustrates a typical dependency tree for software package A 401. Software package A 401 is directly dependent on software package B 402 and hardware package C 403. Software package B 402 is in turn directly dependent on software package D 404. In this situation, software package A 401 is indirectly dependent on software package D 404. In an embodiment of the present invention, the dependency checking function is performed recursively so that a dependency check for software package A 401 will identify the direct dependencies on software package B 402 and hardware package C 403 as well as the indirect dependency on software package D 404. The dependency check may be performed by first querying the KB for records related to software package A 401. The results of this query will reveal the direct dependencies on software package B 402 and hardware component C 403. The KB can then be queried for records related to software package B 402, revealing the indirect dependency on software package D 404. The KB may also be queried for records related to hardware component C 403 and software package D 404, revealing no further dependencies.

The software and hardware management services described above may be provided to subscribing customers for a fee. The services may be provided separately or bundled together. For example, a customer may choose to subscribe to all services except the alert service (i.e. chooses not to receive alert messages from the control server).

A customer may subscribe to receive services based on the particular KB relevant to the customer network's operating system or software components (e.g., Apache or Oracle) Therefore, KB 8 may actually comprise multiple databases, each containing information particular to target computer systems using a different operating system or various software components. In such an embodiment, a customer operating a network based on the Linux operating system may subscribe to the Linux KB. User queries from the customer may then be answered based on information contained in the Linux KB only, and only alert information related to Linux-based systems would be sent to the agent(s) associated with the customer's target computer systems. Furthermore, in the preferred embodiment, payment status information, billing and subscription about the customer is stored in the CIB 5. For example, this information may relate to services to which the customer has subscribed, to which operating system-specific KB database the customer has subscribed, to whether the customer has chosen periodic or transactional billing or to whether the customer has an unpaid outstanding balance. Therefore, control server 4 may query CIB 5 about customer status information before sending an agent in the customer network information retrieved from KB 8.

In an embodiment of the method of providing system management services to a network of target computers in which the communications network 14 is a public network such as the Internet, the method may also include steps for ensuring that communications between the control server and agents associated with the customer network are secure and uncorrupted. In these embodiments, the customer may be assigned a unique identification code, password or cryptographic key.

In another embodiment of the present invention in which the control server stores target computer system information in a CIB, information in the CIB may be collected and provided to interested parties, such as network service providers and software vendors. The information sold may be in the form of demographic information, i.e., information that reflects target computer system information for a plurality of subscribers in the aggregate rather than referring to target computer system information for each subscriber individually. An example of demographic information that may be collected from the CIB and provided to interested parties is the percentage or number of subscribers using particular operating systems, software packages or hardware components. Alternatively, the interested party may be provided with information identifying particular subscribers, e.g., that a particular subscriber uses a Windows-based operating system. Interested parties may be required to pay a fee to receive collected information. Moreover, each subscriber may be asked for permission to provide target computer system demographic or individual information related to that subscriber to an interested party.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A method of determining an effect of at least one action selected from installing, removing and upgrading a first software package on a target computer system memory, the method comprising:

receiving target computer system information from an agent;

accessing a database of information related to a plurality of software packages;

selecting from the database information related to the target computer system information and the first software package;

determining the effect of the action on the target computer system based on the target computer system information received and the information selected from the database; and transmitting a message to the agent informing the agent of the effect of the action.

2. The method of claim 1, further comprising performing the action on the target computer.

3. The method of claim 1, further comprising sending a second message to a user, wherein said second message is related to the message transmitted to the agent.

4. The method of claim 1, further comprising instructing a user on procedures for performing the action.

5. The method of claim 1, wherein the software package is one of a software patch and a software upgrade.

6. The method of claim 2, further comprising changing target computer system information to reflect that the action was performed.

7. A method of recursively checking the dependency of a software package, the method comprising:

identifying a first item upon which the software package depends directly;

identifying a second item upon which the software package depends indirectly;

repeating the steps of identifying the first item and identifying the second item until substantially all items upon which the software package depends have been identified.

8. A method for correcting a target computer system anomaly, the method comprising:

by an agent, collecting target computer system resource data;

by an agent, screening the target computer system resource data for symptomatic conditions;

by a control server, diagnosing the anomaly based on the symptomatic conditions; and informing a user of at least one possible cause for the anomaly.

9. A method for correcting a target computer system anomaly according to claim 8, further comprising transmitting information related to the diagnosed anomaly from the control server to the agent.

10. A method for correcting a target computer system anomaly according to claim 8, further comprising informing a user of a procedure for correcting the anomaly.

11. A method of correcting a target computer system anomaly according to claim 9, wherein the symptomatic conditions are updated by the control server.

12. A method of warning a user of information related to the software configuration of a target computer, the method comprising:

receiving target computer system information from an agent;

accessing stored software information related to the system information received;

determining whether the accessed stored software information is critical to the operation of the target computer; and transmitting an alert message to the agent based on a determination that the accessed stored software information is critical to the operation of the target computer.

13. The method of claim 12, further comprising updating stored software information periodically.

14. The method of claim 12, further comprising receiving proposed target computer system change information.

15. A computer readable medium having computer readable instructions encoded thereon for:

interrogating a target computer system for target computer system information representative of a target computer system configuration;

transmitting target computer system information or a portion thereof to a control server;

receiving instructions from a control server for modifying target computer system information; and modifying target computer system information, wherein the control server accesses information contained in a database of software information based on the transmitted target computer system information.

16. The computer readable medium of claim 15, wherein the target computer system is interrogated periodically.

17. The computer readable medium of claim 15, wherein the target computer system is interrogated upon a user request.

18. The computer readable medium of claim 15, wherein the target computer system is interrogated upon receipt of a signal indicating that the target computer system configuration has changed.

19. The computer readable medium of claim 15, wherein transmission of target computer system information is performed through a communications network.

20. The computer readable medium of claim 19, wherein the communications network is the Internet.

21. The computer readable medium of claim 15, wherein the computer readable instructions are a continuously executed process.

22. A computer readable medium having computer readable instructions encoded thereon for:
   receiving target computer system information related to a target computer system;
   interpreting target computer system information to retrieve related information from a memory containing information related to at least one software package hosted on the target computer system; and
   transmitting information based on the information retrieved from the memory to an agent associated with the target computer system.

23. The computer readable medium of claim 22, the computer readable instructions encoded therein further for translating information retrieved from the memory into a form usable by the agent associated with the target computer.

24. The computer readable medium of claim 22, wherein the information transmitted to the agent is alert information.

25. The computer readable medium of claim 24, further wherein the alert information is not based on target computer system information.

26. The computer readable medium of claim 24, further wherein the alert information is specific to the target computer system information.

27. A computer readable medium having computer readable instructions encoded thereon for:
   measuring target computer system information;
   determining when a measured target computer system parameter exceeds a threshold value;
   transmitting target computer system information to a server in a system for managing a plurality of computers;
   setting a threshold value based on measured target computer system information.

28. The computer readable medium of claim 27, wherein the server is a control server.

29. The computer readable medium of claim 27, wherein the server is a network server.

30. The computer readable medium of claim 27, wherein the server is a Web server.

31. A method of providing system management services to a network of target computers, the method comprising:
   enrolling customers to receive computer system management services for a customer network, the customer network having a target computer system;
   monitoring the customer network through an agent;
   receiving target computer system information from the agent;
   accessing information related to the target computer system information from a database containing software and hardware information;
   transmitting the accessed information to the customer.

32. The method of providing system management services to a network of target computers of claim 31, further comprising determining the type of operating system being used by the target computer system and wherein the database contains information specific to the operating system.

33. The method of providing system management services to a network of target computers of claim 31, further comprising verifying that the customer is enrolled prior to transmitting target computer system information to the customer.

34. The method of providing system management services to a network of target computers of claim 31, further comprising assigning a unique identification code to the customer.

35. The method of providing system management services to a network of target computers of claim 31, further comprising assigning a unique password to the customer.

36. The method of providing system management services to a network of target computers of claim 31, further comprising billing the customer for computer system management services received.

37. The method of providing system management services to a network of target computers of claim 31, further comprising collecting a subscription fee from the customer for computer system management services to be received.

38. The method of providing system management services to a network of target computers of claim 31, wherein the customer may select which computer system management services to receive from a plurality of offered computer system management services.

39. The method of providing system management services to a network of target computers of claim 38, further comprising charging the customer a fee related to the computer system management services selected.

40. The method of providing system management services to a network of target computers of claim 31, wherein the agent is intelligent.

41. The method of providing system management services to a network of target computers of claim 31, wherein the agent is updated by transmitting plug-ins to the agent.

42. A method of providing a management service to at least one subscriber, the at least one subscriber having at least one target computer system having a hardware configuration and a software configuration, the software configuration including one or more computer programs hosted on the target computer system, the method comprising:
   maintaining a database accessible by a control server, the database associating each of a plurality of computer programs with one of requirement information and conflict information;
   hosting an agent process on at least one target computer system of the at least one subscriber responsive to subscriber queries;
   at the agent process, detecting a subscriber query related to a proposed change in the software configuration of at least one of the target computer systems of the at least one subscriber;
   transmitting data representative of the query from the agent to the control server in a communication link, at least a portion of the communication link including a public data communication network;
   at the control server, receiving the data representative of the query and determining an impact of the proposed change in the software configuration of the at least one target computer system based upon at least one of requirement information and conflict information in the database associated with at least one computer program of the software configuration of the target computer; and
   transmitting data representative of the impact from the control server to the agent process through the communication link.

43. The method of claim 42, wherein the public data communication network includes the Internet.

44. The method of claim 42, wherein the proposed change to the software configuration includes adding one or more computer programs to the software configuration of the at least one target computer system of the at least one subscriber and the method further includes determining the impact of the proposed change based upon the requirement information associated with the proposed addition of the computer program.

45. The method of claim 42, wherein the proposed change to the software configuration includes removing one or morea software program from the software configuration and the method further includes determining the impact of the proposed change based upon whether any other software program of the software configuration depends on the software program proposed for removal.

46. A method of providing a management service to a plurality of subscribers, each subscriber having at least one target computer system having a hardware configuration and a software configuration, the software configuration including one or more computer programs hosted on the target computer system, the method comprising:

maintaining a database accessible by a control server, the database associating each of a plurality of computer programs with one of requirement information and conflict information;

hosting an agent process on at least one target computer system of each subscriber responsive to subscriber queries;

at the agent process, detecting a subscriber query related to a proposed change in the software configuration of at least one of the target computer systems;

transmitting data representative of the query from the agent to the control server in a communication link, at least a portion of the communication link including a public data communication network;

at the control server, receiving the data representative of the query and determining an impact of the proposed change in the software configuration of the at least one target computer system based upon at least one of requirement information and conflict information in the database associated with at least one computer program of the software configuration of the target computer; and     transmitting data representative of the impact from the control server to the agent process through the communication link.

47. A method of providing a management service to at least one subscriber, the at least one subscriber having at least one target computer system having a hardware configuration and a software configuration, the software configuration including one or more computer programs hosted on the target computer system, the method comprising:

hosting an agent process on at least one target computer system of the at least one subscriber for monitoring at least one of the software configuration and hardware configuration of each target computer system of the subscriber;

at the agent process, detecting an event or condition related to the hardware or software configuration of at least one of the target computer systems of the at least one subscriber indicative of an impact of performance of the at least one target computer system;

transmitting data representative of the detected event or condition from the agent to a control server in a communication link, at least a portion of the communication link including a public data communication network;

at the control server, receiving the detected event or condition and determining a course of action including a change in one of the software configuration and hardware configuration of the at least one target computer system of the subscriber; and     transmitting data representative of the course of action from the control server to the agent process through the communication link to initiate the course of action at the agent process.

48. The method of claim 47, wherein the public data communication network includes the Internet.

49. The method of claim 47, wherein the step of transmitting data representative of a course of action further includes transmitting data representative of one of a software patch and an updated version of a computer program of the software configuration of the at least one target computer system.

50. The method of claim 47, wherein the step of detecting an event or condition related to the hardware or software configuration of at least one of the target computer systems further includes one of monitoring configuration files of the at least one of the target computer systems and poling the at least one of the target computer systems.

51. A method of providing a management service to a plurality of subscribers, each subscriber having at least one target computer system having a hardware configuration and a software configuration, the software configuration including one or more computer programs hosted on the target computer system, the method comprising:

hosting an agent process on at least one target computer system of each subscriber for monitoring at least one of the software configuration and hardware configuration of each target computer system of the subscriber;

at the agent process, detecting an event or condition related to the hardware or software configuration of at least one of the target computer systems of the subscriber indicative of an impact of performance of the at least one target computer system;

transmitting data representative of the detected event or condition from the agent to a control server in a communication link, at least a portion of the communication link including a public data communication network;

at the control server, receiving the detected event or condition and determining a course of action including a change in one of the software configuration and hardware configuration of the at least one target computer system of the subscriber; and     transmitting data representative of the course of action from the control server to the agent process through the communication link to initiate the course of action at the agent process.

52. A method of providing a management service to at least one subscriber, the at least one subscriber having at least one target computer system having a hardware configuration and a software configuration, the software configuration including one or more computer programs hosted on the target computer system, the method comprising:

maintaining a database accessible by a control server, the database associating each of a plurality of identified computer programs with conditions affecting performance of the computer program;

on at least one target computer system of the at least one subscriber, hosting one of a plurality of agent processes, each of the agent processes being associated with one or more of the target computer systems;

detecting changes in the conditions affecting the performance of at least one particular computer program identified in the database;

transmitting data from a control server to one or more of selected ones of the agent processes representative of a query through a communication link including a public data communication network;

transmitting data through the communication link from each of the selected agent processes, in response to the query, to the control server indicating whether the software configuration of the target computer systems associated with the selected agent include the particular computer program identified in the database; and transmitting data from the control server to the selected agents associated with target computer systems with a software configuration having the particular computer program to initiate a change in the software configuration.

53. The method of claim 52, wherein the public data communication network includes the Internet.

54. The method of claim 52, wherein transmitting data from the control server to the selected agents includes transmitting a message to the selected agents for displaying a warning to an administrator of the subscribers.

55. A method of providing a management service to a plurality of subscribers, each subscriber having at least one target computer system having a hardware configuration and a software configuration, the software configuration including one or more computer programs hosted on the target computer system, the method comprising:

maintaining a database accessible by a control server, the database associating each of a plurality of identified computer programs with conditions affecting performance of the computer program;

on at least one target computer system of each subscriber, hosting one of a plurality of agent processes, each of the agent processes being associated with one or more of the target computer systems;

detecting changes in the conditions affecting the performance of at least one particular computer program identified in the database;

transmitting data from a control server to one or more of selected ones of the agent processes representative of a query through a communication link including a public data communication network;

transmitting data through the communication link from each of the selected agent processes, in response to the query, to the control server indicating whether the software configuration of the target computer systems associated with the selected agent include the particular computer program identified in the database; and transmitting data from the control server to the selected agents associated with target computer systems with a software configuration having the particular computer program to initiate a change in the software configuration.

56. A computer readable medium having computer readable instructions encoded thereon for:

registering subscribers to receive computer system management services for a subscriber network, the subscriber network having a target computer system;

utilizing an agent to supervise the subscriber network;

obtaining target computer system data from the agent;

retrieving data associated to the target computer system data from a database having hardware and software data; and making available the retrieved data to the subscriber.

57. A method of supplying system management services to a network of target computers, the method comprising:

registering subscribers to receive computer system management services for a subscriber network, the subscriber network having a target computer system;

utilizing an agent to supervise the subscriber network;

obtaining target computer system data from the agent;

retrieving data associated to the target computer system data from a database having hardware and software data; and making available the retrieved data to the subscriber.

58. The method of providing system management services to a network of target computers of claim 57, further comprising identifying an operating system utilized by the target computer system and wherein the database has data restricted to the operating system.

59. The method of providing system management services to a network of target computers of claim 57, further comprising confirming that the subscriber is registered before making available target computer system information to the subscriber.

60. The method of providing system management services to a network of target computers of claim 57, further comprising providing a unique identification code and a unique password to the subscriber.

61. The method of providing system management services to a network of target computers of claim 57, further comprising invoicing and collecting a fee from the subscriber for computer system management services delivered and for future delivery of computer system management services.

62. The method of providing system management services to a network of target computers of claim 57, wherein the subscriber may choose particular computer system management services to obtain from a plurality of available computer system management services and wherein the subscriber is invoiced a fee associated with the computer system management services chosen.

63. The method of providing system management services to a network of target computers of claim 57, wherein the agent is intelligent and is updated via the sending of plug-ins.

* * * * *